Sept. 12, 1967  J. T. DAVIS ET AL  3,341,816
AMPLITUDE RANGE SIGNAL MONITORING DEVICE
Filed March 20, 1964
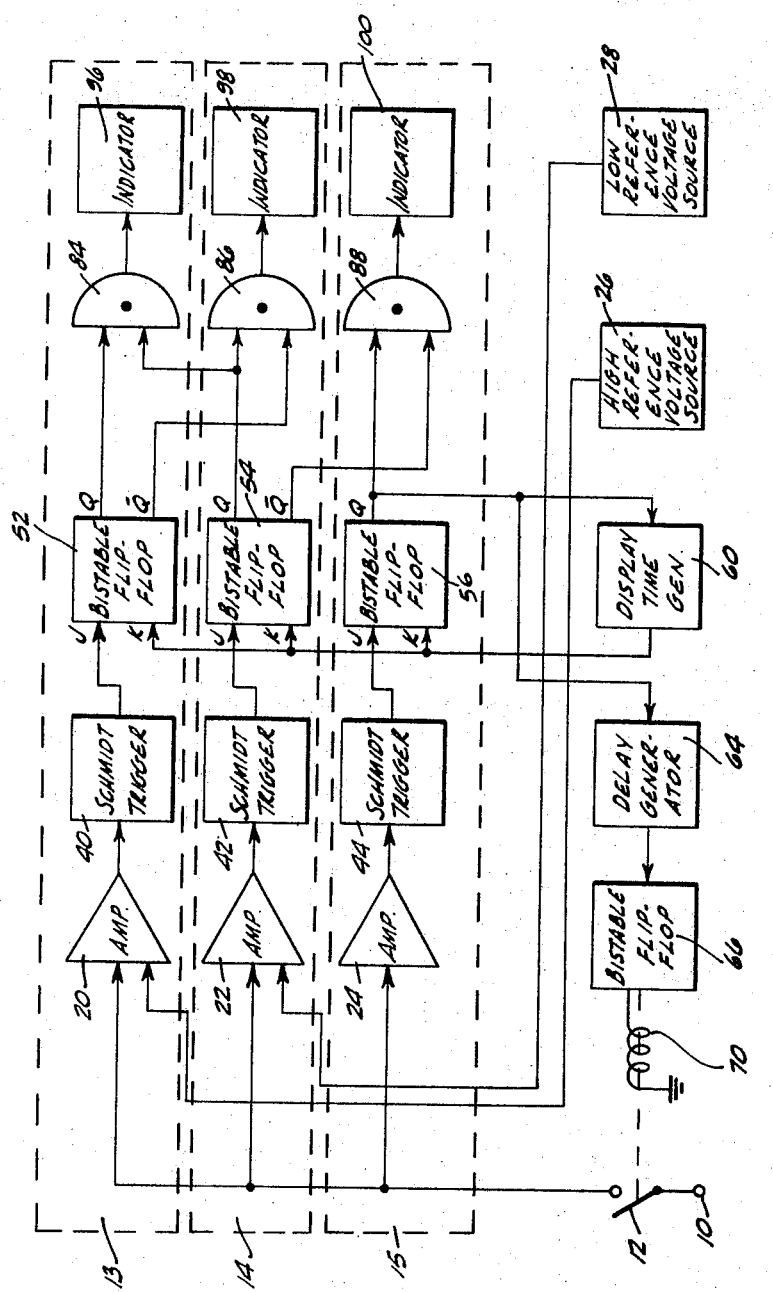
INVENTORS.
JACK T. DAVIS,
WILLIAM H. HILL,
BY
Walter R. Thiel
ATTORNEY.

United States Patent Office 3,341,816
Patented Sept. 12, 1967

3,341,816
AMPLITUDE RANGE SIGNAL MONITORING DEVICE
Jack T. Davis, San Diego, and William H. Hill, Carlsbad, Calif., assignors to Hughes Aircraft Company, Culver City, Calif., a corporation of Delaware
Filed Mar. 20, 1964, Ser. No. 353,503
3 Claims. (Cl. 340—172)

ABSTRACT OF THE DISCLOSURE

This is a monitoring device for sensing the magnitude of an electrical signal and to indicate when said magnitude is below, within, or above a predetermined range of magnitudes. The device includes a plurality of electronic flip-flops which are coupled to gating circuits and operative in accordance with the magnitude of an input electrical signal to indicate the relationship of the magnitude of said signal to a predetermined range of magnitudes.

---

This invention relates to a monitoring device, and more particularly to an electrical circuit to sense the magnitude of an electrical signal and to indicate when said magnitude is below, within or above a predetermined range of magnitudes.

With the increasing emphasis upon reliability the electronics industry has turned from the conventional soldered or crimped connection to those formed by welding techniques such as resistance welding which, in turn, has caused a search for a method of efficiently and inexpensively monitoring the consistency of each welded connection. In this search various methods and systems have been developed, such as welding current sensing devices and voltage feedback regulation systems. While each of these methods have proven satisfactory under certain applications their general use has not been practical because of their cost and complexity.

Therefore, it is an object of the present invention to provide an improved monitoring device which is efficient, reliable and having a cost which would make it practical to incorporate a monitoring device into each welding system.

A further object of the present invention is to provide an improved monitoring device which is simple to operate and easy to interpret.

A still further object of the present invention is to provide an improved monitoring device having a controllable range so that reliable indication can be given for different and varying welding conditions.

Briefly, the present invention comprises a monitoring system which includes three indicating circuits each comprising an amplifier circuit, a Schmitt trigger circuit, a bistable flip-flop circuit, a gating circuit and an indicating means. The indicating circuits are arranged to receive simultaneously an input signal, to compare it with predetermined high and low reference signals, said reference signals defining a range of acceptable conditions, and to indicate the acceptability of the input signal. Also incorporated into the circuit are a pair of signal generators, one of which controls the time the indicating means is rendered operative and the other controls the actuation of a switch to control the duration of the input signal.

Other advantages of the invention will hereinafter become more fully apparent from the following description of the drawing which illustrates in a block diagram the preferred embodiment of the components which comprise the improved monitoring device of the present invention.

Referring now to the drawing, an input signal such as that developed between the electrodes of a resistance welding head by the flow of the welding current through the material held between the electrodes is supplied to an input terminal 10 and is coupled through an operating switch 12 to provide simultaneous inputs to a first or high range indicator circuit 13, a second or go indicator circuit 14 and a third or low range indicator circuit 15. Considering first the high range indicator circuit 13, the input signal is coupled to a first amplifier circuit 20 which may be a pair of conventional solid state differential amplifiers connected in cascade and having a gain of 90, and in a like fashion simultaneously to second and third amplifier circuits 22, 24. The first amplifier circuit 20 also has applied to it a high reference voltage signal supplied from a high reference voltage source 26 such as a potentiometer adjusted conventional precision reference voltage supply, and the second amplifier circuit 22 has applied to it a low reference voltage signal supplied from a low reference voltage source 28 which may be similar to that of the high reference source 26 but adjusted to have a lower voltage output. By proper choice of the components of the first amplifier circuit 20 and the second amplifier circuit 22 they develop output signals only when the magnitude of the voltage of the input signal is greater than the magnitude of the high reference voltage signal and the magnitude of the low reference voltage signal, respectively. However, the third amplifier has an output signal for all magnitudes of voltage of the input signal above a minimum or design operating voltage.

The output signal of each of the amplifier circuits 20, 22, 24 is coupled to a trigger circuit 40, 42, 44 such as a conventional Schmitt trigger circuit of the type described in an article by O. H. Schmitt entitled, "A Thermionic Trigger Circuit," in the Journal of Scientific Instruments, volume 15, pp. 24 through 26, January 1938, and more recently in sections 5–10 and 5–11 of "Pulse and Digital Circuits in the Electrical and Electronic Engineering Series," published in 1956 by McGraw-Hill and whose authors are Jacob Millman and Herbert Taub. Each of the Schmitt trigger circuits 40, 42, 44 is coupled to the input terminal of a conventional bistable multivibrator 52, 54, 56, respectively, such as a J–K flip-flop discussed at page 128 of the text entitled, "Logical Design of Digital Computers," by Montgomery Phister, Jr. A J–K flip-flop of the type herein employed typically has input circuit terminals designated J, K and output circuit terminals designated Q, $\bar{Q}$ and switches between two bistable electrical states. Such a circuit may be a junction transistor flip-flop of the type shown in FIGS. 4–12(a), page 161, of "Digital Computer Components and Circuits" by R. K. Richards. The application of an input signal from the Schmitt triggers 40, 42, 44 to the J input terminal of the flip-flops 52, 54, 56 results in the setting of the flip-flop in its "1" electrical state in which condition the electrical output at the Q output terminal of each of the flip-flops is in its true or "1" representing voltage state. The input signal on the J terminal may be a negative going or a positive going signal, as well established in the art, and the true state of the flip-flop may be represented at the Q output terminal when the voltage at this output terminal is high or low according to the convention which is adopted. The application of an input signal to the K input terminal of the flip-flop switches it to its "0" electrical state in which the electrical output at the $\bar{Q}$ output terminal of each of the flip-flops in its false or "0" representing voltage state.

To receive the output signals from the flip-flop circuits a first, second and third gating circuit 84, 86, 88, such as the conventional "and" gate circuit described in U.S. Patent No. 2,803,401, issued to E. C. Nelson and dated Aug. 20, 1957, are coupled to the Q and $\bar{Q}$ output terminals of the flip-flop circuits.

The term "and" gate is used in the computer art to define a circuit which includes two input circuits or voltages and, according to one convention, has the characteristics of a single high output voltage only when both of the input voltages are high, but if either of the input voltages are substantially low relative to the high input voltage then the output voltage is low. More specifically, the first gate 84 has coupled to it the Q or high output terminal of both the first flip-flop 52 and the Q output terminal of the second flip-flop 54; while the second gate 86 has coupled to it the $\bar{Q}$ or low output terminal of the first flip-flop 52 and the Q output terminal of the second flip-flop 54 and the third gate 88 has coupled to it the Q output terminal of the second flip-flop 54 and the Q output terminal of the third flip-flop 56. To complete the indicator circuits, coupled to the single output terminal of each of the gate circuits 84, 86, 88 are first, second, third indicating means 96, 98, 100, respectively, such as an electric light, bell or recording device. If desired, each of the indicating means 96, 98, 100 may be a different colored light so that the operation of each of the indicating circuits is easily discernible.

Through the coupling of the gates as above described the first indicating means 96 is actuated only when the first flip-flop 52 and the second flip-flop 54 have outputs on the Q output terminals, since the first gate 84 develops an output signal only when both the input signals are present. Therefore, if the input signal at terminal 10 is above the magnitude of the high reference voltage as set by the high reference voltage source 26 both the first and second flip-flops 52, 54 have a "1" or true electrical state output and the first gate 84 has an output signal. However, if the input signal at terminal 10 is below the magnitude of the low reference voltage as set by the low voltage source 28, the first flip-flop 52 remains in its false or "0" electrical state since the first amplifier circuit 20 does not develop an output signal and the second flip-flop 54 also remains in its false or "0" electrical state since the second amplifier circuit 22 does not develop an output signal. However, assuming the input signal at terminal 10 is above the minimum operating signal for the third indicating circuit 15 the third flip-flop 56 has an output signal and this signal coupled with the $\bar{Q}$ output signal for the second flip-flop causes the third gate 88 to have an output signal sufficient to activate the indicating means 100.

Thus, to summarize the operation, if the input signal at terminal 10 is below a preset magnitude both the first and second flip-flops 52, 54 will remain in their low output signal state but the third flip-flop 56 will have an output signal sufficient when coupled with the low output signal of the second flip-flop 54 to actuate, through the third gate 88, the third indicating means 100. Now, if said input signal is above the preset low reference voltage but below the preset high reference voltage the second flip-flop 54 will be in the high output signal state and the first flip-flop 52 will be in the low output signal state, which signal, when coupled at the second gate circuit 86, will activate the second indicating means 98. Now, if the signal is above the preset reference voltage the first flip-flop 52 will be in the high output signal state and the second flip-flop 54 will also be in the high output signal state, which signal, when coupled at the first gate circuit 94, will activate the first indicating means 96.

To provide a means for controlling the length of time the indicating means are rendered operative a display time generator 60, of any conventional type, comprising typical switching transistor controls of a conventional RC network controlling a double base diode (see FIG. 16.7, page 16–6 of the "Handbook of Semiconductor Electronics," edited by Lloyd P. Hunter) to provide time delay in the switching of an output transistor, is coupled to the K input terminal of each of the flip-flops 52, 54, 56 and the Q output terminal of the third flip-flop 56 only. Thus, at the preset time interval after the generator 60 is supplied an input signal from the Q output terminal of the third flip-flop 56, which occurs every time the input signal at terminal 10 is above the operating level of the third indicating circuit 15, an input signal is applied to each of the K input terminals of the three flip-flops to reset them or to place them in their low output signal state in which the $\bar{Q}$ terminals are in the higher of their two voltage states and correspondingly to deactivate the particular indicating means which had been activated. Also coupled to the third flip-flop 56 is a delay generator 64 which typically may be a conventional circuit comprising cross coupled transistors similar to a standard transistor flip-flop which is internally biased to one of its two voltage states and in which timing for switching is controlled by the parameters of an RC circuit. The delay generator 64 is coupled through a conventional bistable flip-flop circuit 66, such as that described above, to the coil of a relay 70 which is adapted to hold the control switch 12 in a closed position for a preset period of time. Typically for welding applications, the delay generator 64 has a time period of 15 milliseconds. This permits an input signal of sufficient duration for monitoring by the three indicating circuits but short enough to protect the circuits against transients common in welding circuits.

As will be noted, the bistable flip-flop 66 is coupled to and controlled by the delay generator 64. As described above, the delay generator is internally biased to one of its two voltage states. In this voltage state the bistable flip-flop 66 is controlled so that the coil 70 of the relay is energized, which closes the contacts 12. At such time, as the welding current traverses the minimum threshold, the circuits, including the amplifier 24, the Schmitt trigger 44 and the flip-flop 56 operate, resulting in setting of the flip-flop 56 to its electrical state in which the voltage of its output terminal Q is at gate enabling level. This voltage is coupled input-wise to the display time generator 60 and to the delay generator 64 which begin their timing operations. At the end of the timing operation the delay generator 64 switches the flip-flop 66 so that the coil 70 of the relay is de-energized, which opens the contacts 12. Meanwhile, the display time generator 60 continues its timing operation and at the end of the predetermined display period the output of the display time generator, which is coupled input-wise to the K input terminals of each of the bistable flip-flops 52, 54 and 56, operates to set these flip-flops in their $\bar{Q}$ electrical states in which the voltages at the $\bar{Q}$ terminals are at gate enabling level. At this time also the flip-flop 66 is switched to again energize the coil 70 and close the relay contacts 12 so that the circuit is again set for a monitoring operation.

While one embodiment of this invention has been herein illustrated, it should be appreciated by those skilled in the art that variations of the disclosed arrangement, both as to its details and to the organization of such details, may be made without departing from the spirit and scope thereof. Accordingly, it is intended that the foregoing disclosure and showings made in the drawing may be considered as illustrative of the principles of this invention and not construed in a limiting sense.

What is claimed is:

1. An electronic signal monitoring device comprising:
   (1) a first reference voltage source adapted to develop a reference voltage of a predetermined controllable magnitude;
   (2) a second reference voltage source adapted to develop a reference voltage of a predetermined controllable magnitude; less than that of said first source;
   (3) first, second and third electrical signal amplifying means each adapted to receive simultaneously an input signal of unknown magnitude, said first and second amplifying means being adapted to receive said first and second reference voltages said first amplifying means being adapted to develop an output signal when said input signal has a magnitude greater than the magnitude of said first reference voltage and said second amplifying means being adapted to develop an output signal when said input signal has a magnitude greater than the magnitude of said second reference voltage;

(4) first, second and third trigger circuits coupled to said first, second and third amplifying means respectively and each adapted to develop a triggering pulse when the amplifying means coupled thereto develops an output signal of a predetermined magnitude;

(5) a first bistable flip flop means coupled to said first trigger circuit, a second bistable flip flop means coupled to said second trigger circuit and a third bistable flip flop means coupled to third trigger circuit, each of said flip flop means being adapted to be in a first electrical state and to have a first output signal when a triggering pulse is supplied thereto by said trigger circuit and to be in a second electrical state and to have a second output signal during all other conditions;

(6) first gating means coupled to receive the first output signal of said first flip flop means and the first output signal of said second flip flop means, second gating means coupled to receive the second output signal of said first flip flop means and the first output signal of said second flip flop means and a third gating means coupled to receive the second output signal of said second flip flop means and the first output signal of said third flip flop means; and (7) a plurality of indicator means each coupled to a different one of said gating means and each adapted to be operative when the signals applied to the corresponding gating means are of a predetermined magnitude.

2. An electronic signal monitoring device comprising:
(1) a first reference voltage source adapted to develop a reference voltage of a predetermined controllable magnitude;
(2) a second reference voltage source adapted to develop a reference voltage of a predetermined controllable magnitude; less than that of said first source;
(3) first, second, and third electrical signal amplifying means each adapted to receive simultaneously an input signal of unknown magnitude, said first and second amplifying means being adapted to receive said first and second reference voltages said first amplifying means being adapted to develop an output signal when said input signal has a magnitude greater than the magnitude of said first reference voltage and said second amplifying means being adapted to develop an output signal when said input signal has a magnitude greater than the magnitude of said second reference voltage;
(4) first, second and third trigger circuits coupled to said first, second and third amplifying means respectively and each adapted to develop a triggering pulse when the amplifying means coupled thereto develops an output signal of a predetermined magnitude;
(5) a first bistable flip flop means coupled to said first trigger circuit, a second bistable flip flop means coupled to said second trigger circuit and a third bistable flip flop means coupled to third trigger circuit, each of said flip flop means being adapted to be in a first electrical state and to have a first output signal when a triggering pulse is supplied thereto by said trigger circuit and to be in a second electrical state and to have a second output signal;
(6) first gating means coupled to receive the first output signal of said first flip flop means and the first output signal of said second flip flop means, second gating means coupled to receive the second output signal of said first flip flop means and the first output signal of said second flip flop means and a third gating means coupled to receive the second output signal of said second flip flop means and the first output signal of said third flip flop means;
(7) a plurality of indicator means each coupled to a different one of said gating means and each adapted to be operative when the signals applied to the corresponding gating means are of a predetermined magnitude;
(8) a first signal generating means adapted to be actuated by the first output signal of said third flip flop means and to supply to each of said first, second, and third flip flops after a predetermined controllable time an input signal adapted to place said flip flops in said second electrical state;
(9) a second signal generating means coupled in parallel with said first signal generating means and adapted to develop an output signal at a predetermined controllable time after actuation of said first signal generating means; and
(10) means coupled to and controlled by said second signal generating means for controlling coupling of said input signal to said first, second and third signal amplifying means.

3. An electronic signal monitoring device comprising:
(1) a control switch;
(2) a first reference voltage source adapted to develop a reference voltage of a predetermined controllable magnitude;
(3) a second reference voltage source adapted to develop a reference voltage of a predetermined controllable magnitude; less than that of said first source;
(4) first, second, and third electrical signal amplifying means each adapted to receive simultaneously an input signal of unknown magnitude when said control switch is activated, said first and second amplifying means being adapted to receive said first and second reference voltages said first amplifying means being adapted to develop an output signal when said input signal has a magnitude greater than the magnitude of said first reference voltage and said second amplifying means being adapted to develop an output signal when said input signal has a magnitude greater than the magnitude of said second reference voltage;
(5) first, second and third trigger circuits coupled to said first, second and third amplifying means respectively and each adapted to develop a triggering pulse when the amplifying means coupled thereto develops an output signal of a predetermined magnitude;
(6) a first bistable flip flop means coupled to said first trigger circuit, a second bistable flip flop means coupled to said second trigger circuit and a third bistable flip flop means coupled to third trigger circuit, each of said flip flop means being adapted to be in a first electrical state and to have a first output signal when a triggering pulse is supplied thereto by said trigger circuit and to be in a second electrical state and to have a second output signal during all other conditions;
(7) first gating means coupled to receive the first output signal of said first flip-flop means and the first output signal of said second flip-flop means, second gating means coupled to receive the second output signal of said first flip-flop means and the first output signal of said second flip-flop means and a third gating means coupled to receive the second output signal of said second flip-flop means and the first output signal of said third flip-flop means;
(8) a plurality of indicator means each coupled to a different one of said gating means and each adapted to be operative when the signals applied to the corresponding gating means are of a predetermined magnitude;

(9) a first signal generating means adapted to be actuated by the first output signal of said third flip-flop means and to supply to each of said first, second, and third flip-flop means, after a predetermined controllable time, an input signal adapted to place said flip-flop means in said second electrical state;

(10) a second signal generating means coupled in parallel with said first signal generating means and adapted to develop an output signal at a predetermined controllable time after actuation of said first signal generating means; and

(11) a triggering and holding means coupled electrically to the second signal generating means and mechanically to said control switch adapted to hold said switch in an operative position for a specific period of time as controlled by said second signal generating means.

References Cited

UNITED STATES PATENTS

| | | | |
|---|---|---|---|
| 2,636,983 | 4/1953 | Poole | 250—27 |
| 2,927,707 | 3/1960 | Fiehrer et al. | 250—27 |
| 3,050,713 | 8/1962 | Harmon | 340—172 |
| 3,142,037 | 7/1964 | Gazale | 340—172 |
| 3,158,838 | 11/1964 | Gilbert | 340—172 |

NEIL C. READ, *Primary Examiner.*

H. I. PITTS, *Assistant Examiner.*